United States Patent [19]
Baron

[11] 4,239,305
[45] Dec. 16, 1980

[54] LIVE ROLLER CIRCLE FOR POWER SHOVELS AND THE LIKE

[75] Inventor: George B. Baron, Marion, Ohio

[73] Assignee: Dresser Industries, Inc., Dallas, Tex.

[21] Appl. No.: 6,553

[22] Filed: Jan. 24, 1979

[51] Int. Cl.³ .................................................. F16C 19/30
[52] U.S. Cl. ...................................... 308/222; 308/223
[58] Field of Search .............. 308/220, 222, 231, 226, 308/223, 229; 414/694, 719

[56] References Cited

U.S. PATENT DOCUMENTS

| | | | |
|---|---|---|---|
| 755,516 | 3/1904 | Miller et al. | 308/222 |
| 1,169,150 | 1/1916 | Heim | 308/231 |
| 3,146,040 | 8/1964 | Gist | 308/222 |
| 3,409,338 | 11/1968 | Root et al. | 308/231 |
| 4,085,854 | 4/1978 | Baron | 414/719 |

*Primary Examiner*—Lenard A. Footland
*Attorney, Agent, or Firm*—Ward, Lalos, Leeds, Keegan & Lett

[57] ABSTRACT

In a large, heavy-duty machine such as a power shovel and the like, having a lower frame, an upper frame and a live roller circle including a lower rail mounted on the lower frame, a roller cage structure, a plurality of pins mounted on the cage structure, rollers mounted on the pins of the cage structure and supported in rolling contact with the roller rail and an upper rail mounted on the upper frame and supported on the rollers, wherein the center of gravity of the machine travels beyond the live roller circle during normal operating conditions, the improvement comprising a set of at least two cylindrical rollers mounted on each pin of the cage structure of the roller circle.

3 Claims, 4 Drawing Figures

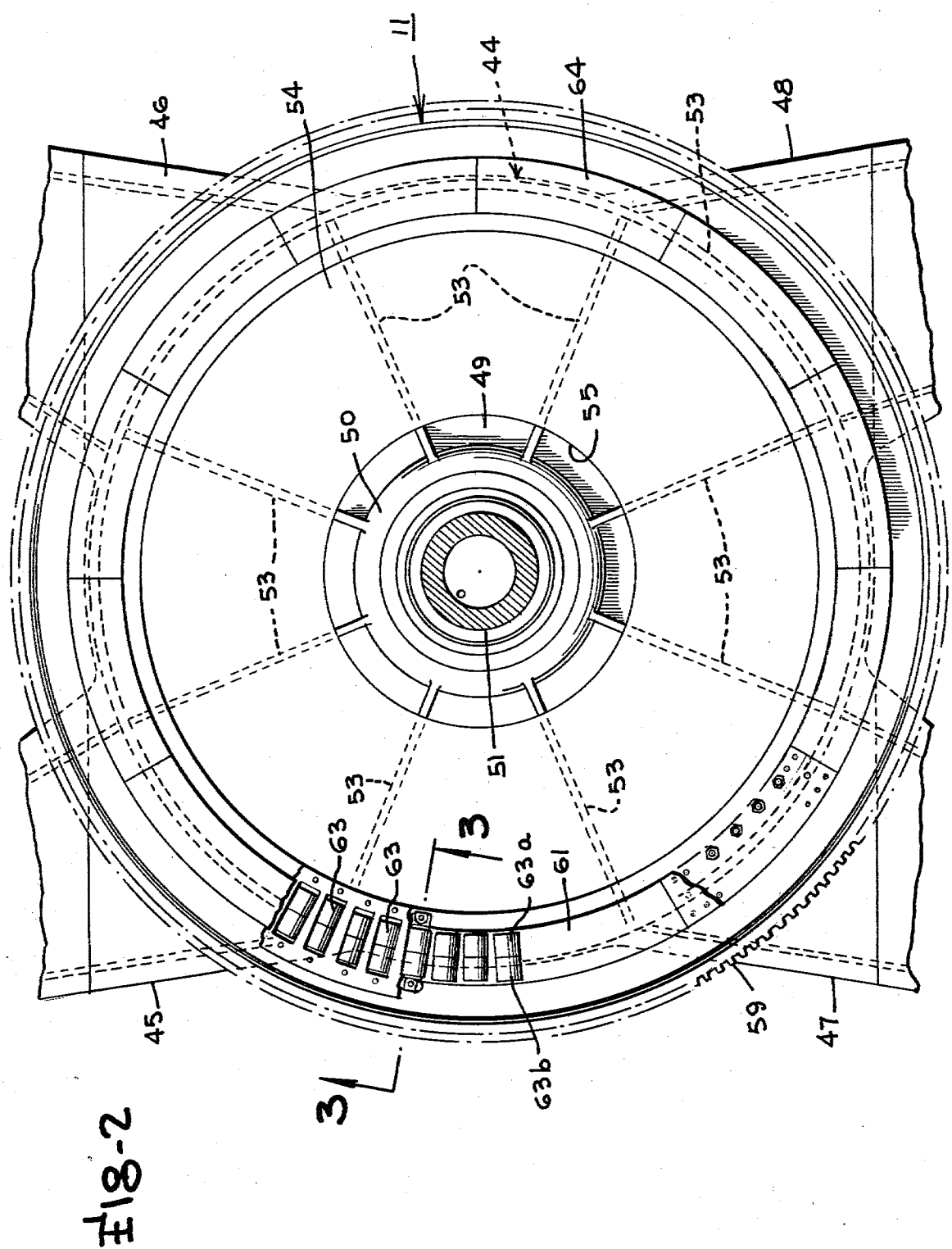

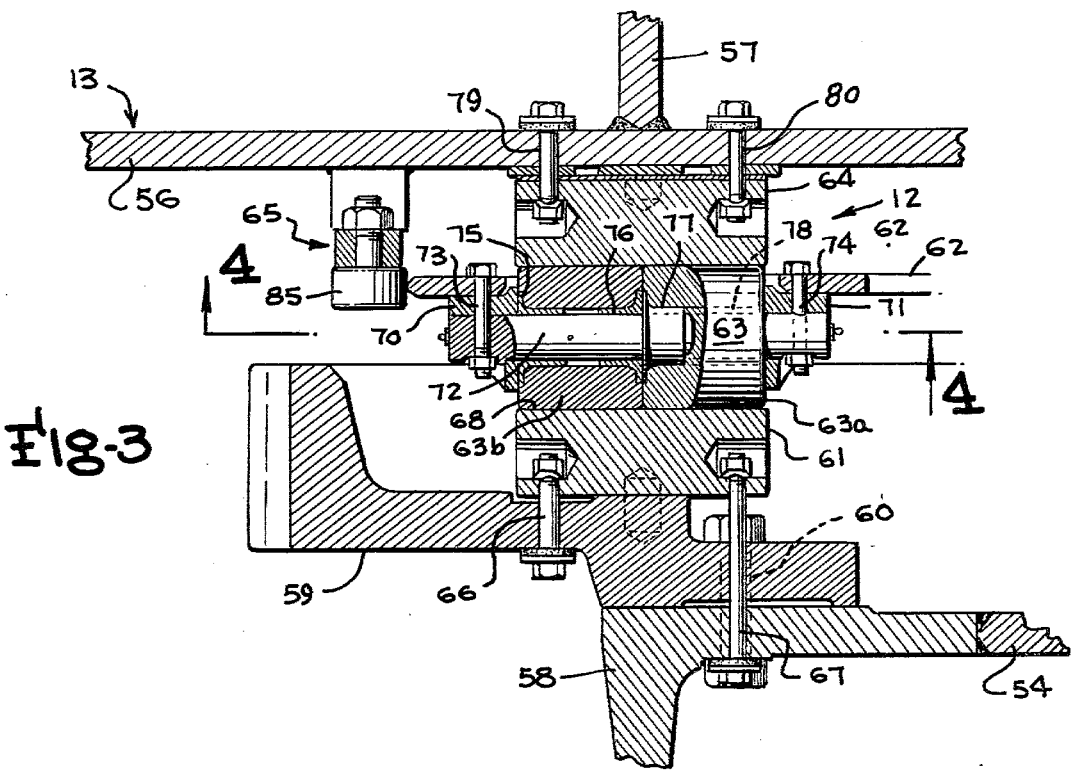
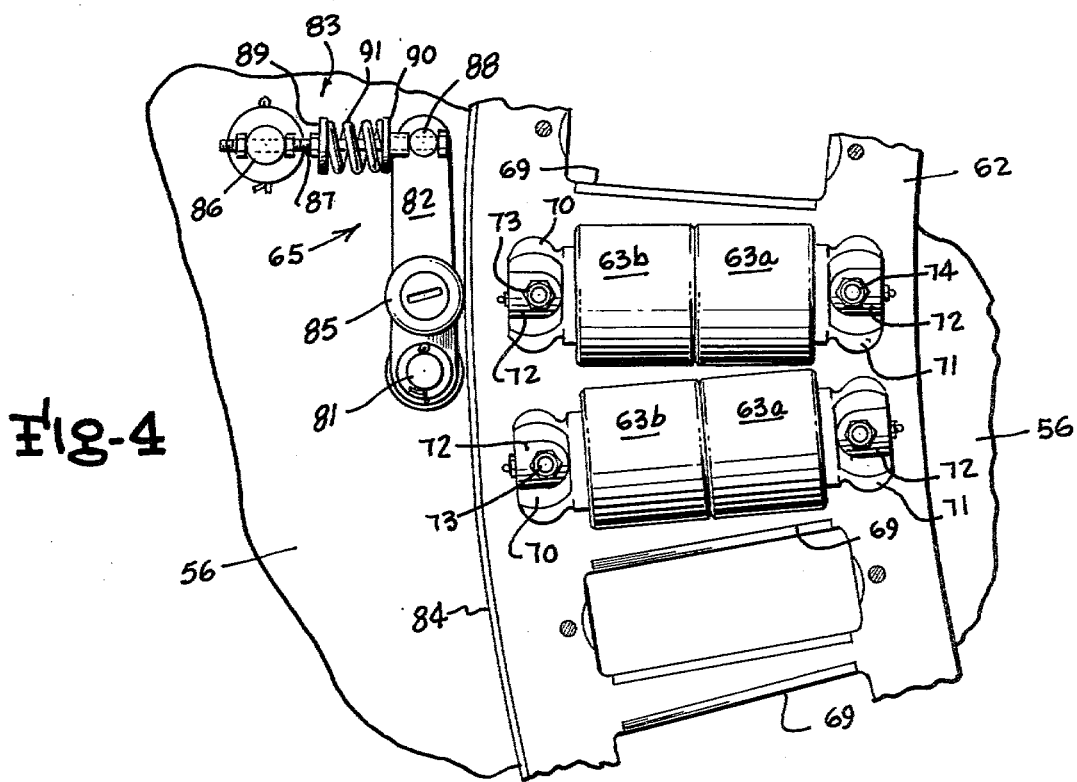

LIVE ROLLER CIRCLE FOR POWER SHOVELS AND THE LIKE

This invention relates to large, heavy-duty machines such as power shovels and the like, and more particularly to an improved live roller circle for such type of machines.

In large, heavy-duty mining shovels and draglines, there usually is provided a lower frame, a live roller circle mounted on the lower frame and an upper frame mounted on the live roller circle for rotation relative to the lower frame. The conventional live roller circle usually consists of a lower rail mounted on the lower frame, a cage structure provided with a plurality of rollers mounted on the lower rail and an upper rail mounted on the upper frame and supported on the rollers. Since the tangential velocity of the roller increases along the length thereof, thus causing slippage and correspondingly undue wear at the outer ends of cylindrical rollers, it has been the conventional practice in the prior art to utilize tapered rollers.

In larger machines such as draglines, having live roller circle diameters in the order of approximately 40 to 60 feet, the position of the center or gravity of the machine during normal operating conditions is located within the roller circle. Such condition permits the use of rails in the roller circle of minimum width. However, as the diameter of the roller circle decreases, as in the case of smaller mining shovels, there is a greater likelihood that the center of gravity of the machine will wander outside of the roller circle thus necessitating lower and upper rails of the roller circle having increased widths. It has been found, however, that the use of tapered rollers in such machines having comparatively smaller diameter roller circles and rails of greater widths is undesirable from manufacturing, cost and performance points of view.

Accordingly, it is the principle object of the present invention to provide an improved live roller circle.

Another object of the present invention is to provide an improved live roller circle for larger, heavy-duty machines such as power shovels and the like.

A further object of the present invention is to provide an improved live roller circle for a larger, heavy-duty machine such as a power shovel and the like, in which the center of gravity of the machine is apt to travel beyond the roller circle during normal operating conditions of the machine.

A still further object of the present invention is to provide an improved live roller circle for a large, heavy-duty machine having a comparatively small roller circle diameter and a comparatively larger rail width.

Another object of the present invention is to provide an improved live roller circle for a large, heavy-duty machine having rails of comparatively greater width than comparable machines in the prior art which do not require tapered rollers for contending with slippage of the rollers resulting from differential tangential velocities of the rollers.

A further object of the present invention is to provide an improved line roller circle for a large, heavy-duty machine such as a power shovel and the like, having a comparatively smaller roller circle diameter and wider rail which is adapted to utilize cylindrical rollers.

Another object of the present invention is to provide an improved live roller circle for large, heavy-duty machines such as power shovels and the like which is comparatively simple in design, economical to manufacture and highly effective in performance.

Other object and advantages of the present invention will become more apparent to those persons having ordinary skill in the art to which the present invention pertains from the following description taken in conjunction with the accompanying drawings wherein:

FIG. 2 is an enlarged cross-sectional view taken along line 2—2 in FIG. 1;

FIG. 3 is an enlarged cross-sectional view taken along line 3—3 in FIG. 2; and

FIG. 4 is a cross-sectional view taken along line 4—4 in FIG. 3.

Figure 1:
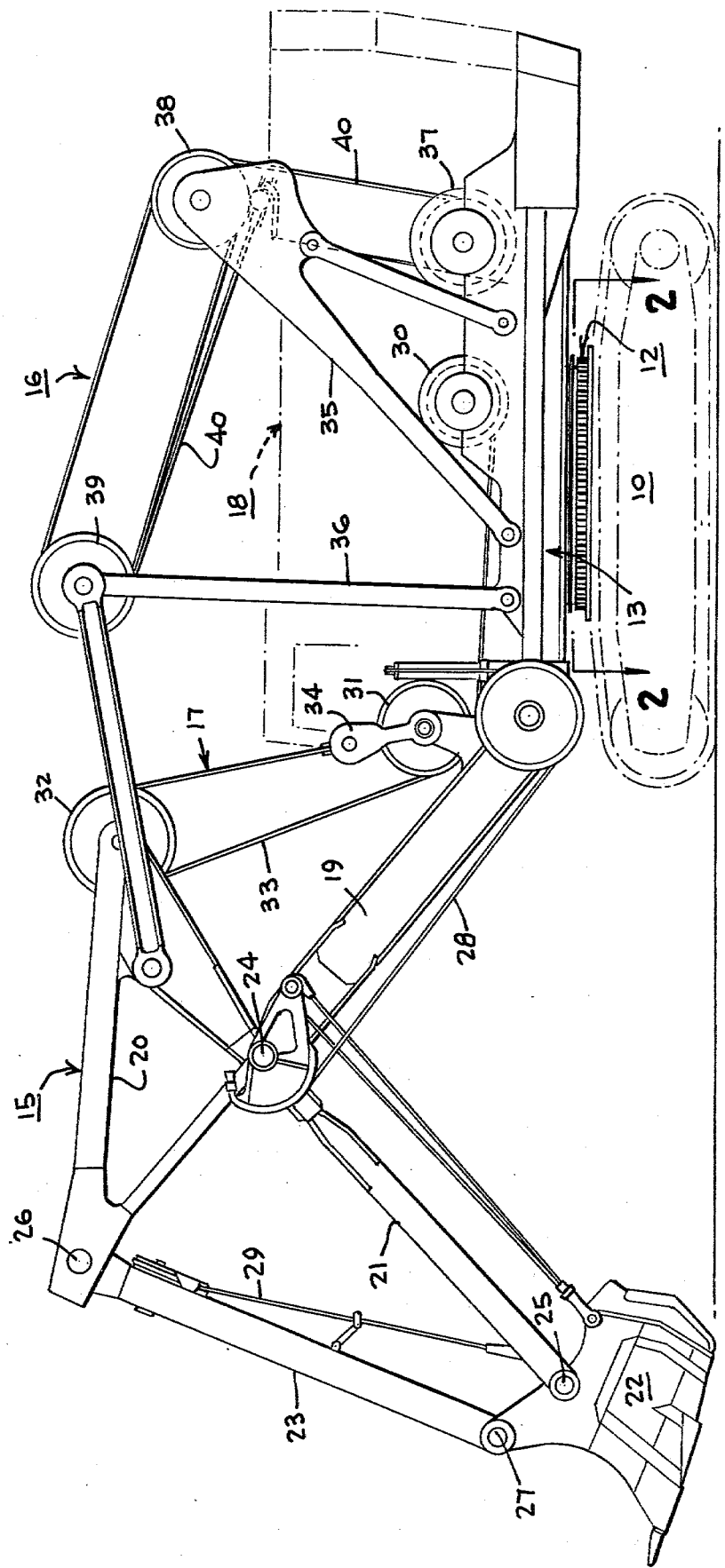
FIG. 1 is a side, elevational view of a power shovel utilizing an embodiment of the present invention.

Referring to FIG. 1 of the drawings, there is illustrated a power shovel utilizing an embodiment of the present invention which generally includes a pair of crawler units 10, a lower frame 11 mounted on the crawler units, a live roller circle 12 mounted on the lower frame, an upper frame 13 rotatably supported on the roller circle, a main deck 14 mounted on the upper frame, a front end assembly 15 mounted on the front end of the upper frame, a crowd system 16 mounted on the main deck and operatively connected to the front end assembly, a hoist system 17 mounted on the front end assembly, and appropriate machinery and controls mounted on the main deck for operating the crowd and hoist systems. A housing 18 also is mounted on the main deck which encloses certain structural components, the swing and propulsion machinery of the shovel and other auxiliary systems and equipment.

Front end assembly 15 generally includes a stiffleg 19, a hoist frame 20, a dipper handle 21, a dipper 22 and a hoist link 23. Stiffleg 19 consists of a structural member pivotally connected at its lower end to the front end of upper frame 13 and is provided at its upper end with a head shaft 24. Hoist frame 20 is pivotally mounted on head shaft 24. Dipper handle 21 consists of a suitable structural member and is provided with upper and lower bifurcated ends. The upper bifurcated end is connected to the hoist frame by means of a pair of connecting pins. The lower bifurcated end of the dipper handle is pivotally connected to the upper rear end of dipper 22 by means of a pair of axially aligned pins 25. The forwardly disposed head section of the hoist frame and the upper front end of the dipper are connected by hoist link 23. The upper end of the hoist link is connected to a bifurcated portion of the head section of the hoist frame by means of a connecting pin 26. The lower bifurcated end of the hoist link is connected to the dipper by means of a pair of axially aligned pins 27. It thus will be seen that hoist frame 20, dipper handle 21, dipper 22 and hoist link 23 are pivotally connected together to provide a four-bar linkage with the link comprising the hoist frame being pivotally connected to the upper end of the stiffleg by means of head shaft 24.

To provide a substantially flat pass of the dipper when it is crowded into a bank of material being excavated or loaded, there is provided on the front end assembly a pitch control system 28, the construction and operation of which is fully described in U.S. Pat. Nos. 3,501,034 and 3,648,863. In addition, the front end assembly is provided with a pitch stop assembly 29, the construction and operation of which is fully described in U.S. Pat. No. 4,085,854.

Hoist system 17 generally includes a hoist drum 30, sheaves 31 and 32 and a hoist line 33. Hoist drum 30 is mounted on main deck 14 of the machine and is driven by an electric motor through a gear train also mounted on the main deck. Sheave 31 is mounted on the lower end of stiffleg 19 in longitudinal alignmment with hoist drum 30. Sheave 32 is mounted on an upper, rearward end of hoist frame 20. As illustrated in FIG. 1, hoist line 33 is wound on hoist drum 30, extends forwardly and around sheave 31, extends upwardly and around sheave 32 and extends downwardly and is connected to a bail 34 mounted on the mounting shaft of sheave 31. It further will be seen that by operating hoist drum 30 to pay out and take in hoist line 33, hoist frame 20, dipper handle 21 and hoist link 23 will be caused to pivot about head shaft 24 to correspondingly hoist and lower the dipper.

Crowd system 16 consists of a gantry 35, a mast 36, a drum 37, sheaves 38 and 39 and a crowd rope 40. Gantry 35 is mounted on the main deck along the longitudinal center line of the machine. Mast 36 consists of a structural member pivotally connected at its lower end to brackets secured to the main deck, forwardly of the vertical center line of roller circle 12. Crowd drum 37 is mounted on a frame secured to the main deck, rearwardly of hoist drum 30. Similarly to hoist drum 30, crowd drum 37 is driven by an electric motor mounted on the main deck, through a gear train also mounted on the main deck. Sheave 38 is mounted on the upper end of the gantry, substantially above crowd drum 37. Sheave 39 is mounted on the upper end of mast 36 substantially in longitudinal alignment with sheave 38. Crowd rope 30 is wound on crowd drum 37, extends upwardly and is reeved about sheaves 38 and 39 and is connected at the opposite end thereof to a bail 42 mounted on the upper end of the gantry adjacent sheave 38. Crowd link 41 is pivotally connected at the ends thereof to hoist frame 20 and a shaft 43 mounted on the upper end of the mast so that pivotal motion of the mast on a vertical plane will be transmitted by crowd link 41 to the front end assembly of the machine. It will be appreciated that by paying out and taking in crowd rope 40 mast 36 will be caused to pivot in a vertical plane and that such motion will be transmitted to the front end assembly through crowd link 41 to raise and lower the front end assembly.

Referring to FIG. 2, lower frame 11 consists of a main body section 44 having a plurality of laterally projecting leg sections 45 through 48 connected at their outer ends to crawler units 10. Lower frame section 44 includes a bottom plate 49, a center journal housing 50 accommodating a center journal 51 and mounted on lower plate 49, a peripheral, circular rib 52 seated on lower plate 49, a plurality of radially disposed bulkheads 53 mounted on the lower plate and interconnecting the center journal housing and circular rib 52 and an annular plate 54 connected to the upper ends of radial bulkheads 53 and circular rib 52. Upper plate 54 is provided with a center opening 55 which is adapted to receive the upper end of center journal 51 therethrough which is operatively connected to upper frame 14. As in conventional machines of this type, the center journal functions to prevent the upper frame from shifting relative to the lower frame and to transmit upward and radial loads imposed on the upper frame, to the lower frame. Upper frame 13 is substantially similar in construction to main frame section 44 of the lower frame and includes a lower plate 56, a center journal housing operatively connected to center journal 51, a peripheral, circular rib 57 disposed substantially in vertical alignment with vertical rib 52 of the lower frame, a plurality of radially disposed bulkheads comparable to bulkheads 53 in the lower frame and upper deck 14 which is supported on the upper ends of circular rib 57 and the radially disposed bulkheads.

Main body section 44 of the lower frame is provided with a corner casting 58 which provides a smooth, reduced stress transition from upper plate 54 to circular rib 52. A ring gear 59 is mounted on corner casting 58, which is disposed concentrically relative to center journal 51. The ring gear consists of a plurality of arcuate segments disposed in end-to-end relation which are rigidly secured to corner casting 58 by means of a plurality of bolts 60. A set of swing drive units are mounted on the upper frame which are provided with downwardly projecting shafts having pinions which operatively engage ring grear 59. It will be appreciated that upon operation of such units, the pinions thereof will react with the ring gear to rotate or swing the upper frame relative to the lower frame about the axis of the center journal.

Live roller circle 12 generally consists of a lower rail 61, a cage structure 62, a plurality of sets of rollers 63, an upper rail 64 and a plurality of cage guide assemblies 65. Lower rail 61 consists of a plurality of arcuate segments disposed in end-to-end relation, seated on the inner base portion of ring gear 59, above circular rib 52. The lower rail segments are rigidly secured to the lower frame by means of a first set of bolts 66 rigidly securing the outer peripheries of the rail segments to the ring gear, and a second set of bolts 67 securing the inner peripheries of the rail segments to corner casting 58. The rail segments provide a flat, circular surface 68 on which rollers 63 ride.

Cage structure 62 also consists of a plurality of arcuate segments spliced together and provided with openings 69 for receiving the upper ends of rollers 63 therethrough. The cage structure is provided with a plurality of sets of depending brackets 70 and 71, each of which carries a pin 72. Each of the pins 72 is disposed radially relative to the center journal, below a cage opening 69, and is rigidly secured to the cage structure along with depending brackets 70 and 71 by a set of bolts 73 and 74.

Rotatably mounted on each pin 72 is an inner cylindrical roller 63a and an outer cylindrical roller 63b which are supported in rolling contact on upper surface 68 of lower rail 61 and which have the upper ends thereof projecting through opening 69. As best illustrated in FIG. 3, roller 63b is provided with bushings 75 and 76 and is restrained from axial movement by roller 63a and bracket 70. Similarly, roller 63a is provided with bushings 77 and 78 and is restrained from lateral movement by roller 63b and depending bracket 71. Rollers 63a and 63b are substantially identical in construction, having the same lengths, and inside and outside diameters. Because of the reduced length of such rollers, such rollers may be produced by upset forging which greatly enhances the strength characteristics of the rollers.

Upper rail 64 is adapted to ride on rollers 63 and consists of a plurality of arcuate segments disposed in end-to-end relation. Such segments are rigidly secured to the lower plate of upper frame 13 by means of sets of bolts 79 and 80. The rail segments of upper rail 64 are substantially similar to the rail segments of lower rail 61 and are disposed in vertical alignment therewith along with rollers 63.

Guide assemblies 65 are spaced circumferentially about cage structure 62 and function to guide the cage structure and to maintain its concentricity relative to the center journal. Each of such assemblies is mounted on the upper frame and is adapted to biasingly engage the outer edge of cage structure 62. As best illustrated in FIG. 4, each of such assemblies includes a depending pin 81, a pivot arm 82 and a biasing unit 83. Pivot pin 81 projects downwardly from lower plate 56 of the upper frame and is disposed adjacent outer edge 84 of the cage structure. Pivot arm 82 is pivotally connected to pin 82 and is provided with a roller 85 which engages outer edge 84 of the cage structure. Unit 83 includes a depending pin 86 having a rod 87 extending through an opening in a depending pin portion 88 formed on the free end of pivot arm 82. Rod 87 is provided with an end wall 89 fixed on the rod adjacent pin 86, a movable end wall 90 slidable along the length of rod 86 and engageable with pin portion 88 and a spring 91 interposed between end walls 89 and 90. It will be appreciated that spring 91 will function to bias pivot arm 82 inwardly and, correspondingly, roller 85 into engagement with outer edge 84 of the cage structure.

At the beginning of each digging cycle of the machine as described, the crowd system is operated to fully retract the front end assembly and the hoist system is operated to lower the dipper so that the dipper is positioned adjacent the lower end of the stiffleg. To commence the operating cycle of the machine, the operation manipulates appropriate controls at the operator's station on the machine to permit the crowd rope to pay out. Under such conditions, the weight of the front end assembly will cause the stiffleg to pivot forwardly, crowding the dipper into the material being excavated or loaded. Simultaneously with the commencement of the crowding action of the dipper, appropriate controls are operated on the machine to effect limited hoisting motion of the dipper. This is accomplished by operating hoist drum 30 to take up hoist line 33. As the dipper is crowded into the bank of material, the combined crowding and hoisting action causes the dipper to make a flat pass. At the same time, pitch control system 28 causes the pitch of the dipper to remain constant relative to the ground. At the end of the crowd phase of the cycle, the pitch control mechanism is released to cause the dipper to pitch upwardly and thus assure a full load of material in the dipper. The upward pitch of the dipper is restricted by pitch stop assembly 29 in the manner as described in the aforementioned patent relating to such system.

After the dipper has been pitched upwardly, controls for the crowd and hoist systems and swing machinery are operated to move the dipper and position it above the dump body of a hauling vehicle or another suitable repository for the material where the door of the dipper is tripped to cause the door to open and the material to be unloaded. The desired retracting motion of the front end assembly is effected by operating the motor for crowd drum 37 to take in crowd rope 40. Under such conditions, mast 36 will be caused to pivot rearwardly and such motion will be transmitted to the front end assembly causing the stiffleg to pivot upwardly.

As soon as the material has been dumped, the swing machinery can be operated to rotate the front end of the machine back to the embankment, the crowd system can be operated to continue to retract the front end assembly and the hoist system can be operated to permit the dipper handle to swing downwardly at a controlled rate until the dipper again is positioned at the lower end of the stiffleg, ready to begin another operating cycle.

In large, heavy-duty machines such as draglines, where the center of gravity remains within the roller circle during normal operating conditions, it has been found that the contact width of a cylindrical roller on a flat rail should not exceed about 5% of the mean diameter of the roller circle. However, in heavy-duty machines where the mean diameter of the roller circle is smaller and the center of gravity of the machine is apt to travel beyond the roller circle, a wider rail, in excess of the rule of thumb 5% of the mean diameter of the roller circle is required to maintain the contact stresses within an allowable range. Typically, as is applicable to the machine as described, the mean diameter of the roller circle is 200 inches and the rail is 13 inches wide, well in excess of the rule of thumb 5% of the mean diameter of the roller circle. In such instances where a wider rail width is required to maintain contact stresses within an allowable range, the alternative roller arrangements available in the prior art would be cylindrical rollers of increased length or tapered rollers. The use of longer rollers, however, is undesirable in that slippage and correspondingly excessive wear at the outer ends of the rollers is increased. Such wear at the outer ends of the rollers will cause the contact pressures near the centers of the rollers to increase to destructive levels, eventually resulting in spalling and premature failure. The use of tapered rollers is equally undesirable in view of the traditional problems of flange wear, rail concentricity and inaccurate cages typically associated with the use of tapered rollers.

The use of two short cylindrical rollers on each pin in the cage of the roller circle as described in connection with the aforementioned embodiment of the invention results in maintaining contact stresses within an allowable range while obviating the adverse effects and problems of the aforementioned alternative arrangements in that each of the rollers on a single pin in the cage of the roller circle rotates at its own speed. Sliding of each individual roller on a pin is only about half as great as it would be with a single longer roller on the pin. Wear correspondingly is reduced at the outer ends of the rollers which would have the effect of reducing contact pressures at the centers of the rollers and eventual spalling and premature failure.

The use of two short rollers on a single pin in the cage of the roller circle in lieu of a single long cylindrical roller or a single tapered roller has a number of advantages. Initially, as previously mentioned, slipping is reduced substantially thus eliminating high contact pressures at the centers of the rollers and eventual wear and failure. The smaller rollers also provide the advantage of having a better shape which is more adapted to upset forging, the desired method of forming rollers. Furthermore, the use of rollers of smaller length allows easier control of roller diameter considering the fact that longer rollers are more apt to be slightly tapered due to machine tool inaccuracy.

From the foregoing detailed description, it will be evident that there are a number of changes, adaptations and modifications of the present invention which come within the province of those persons having ordinary skill in the art. However, it is intended that all such variations not departing from the spirit of the invention be considered as within the scope thereof and as limited solely by the appended claims.

I claim:

1. An improved live roller circle structure for a large heavy-duty machine, such as a power shovel, which is subject to large eccentric loads wherein said machine includes a lower frame, an upper frame rotatably mounted on said lower frame by said live roller circle, wherein said roller circle structure includes a lower rail mounted on said lower frame, said lower rail having a width which exceeds 5% of the mean diameter of said roller circle, a roller cage structure, a plurality of pins mounted on said roller cage structure, rollers mounted on said pins and supported in rolling contact with said lower rail and an upper rail mounted on said upper frame and supported on said rollers, said upper rail having a width substantially equal to that of said lower rail and wherein said roller circle is arranged with respect to said upper and lower frames and said eccentric load is of a value as to cause the center of gravity of the machine to travel beyond the diameter of said roller circle under normal operating conditions, said improved live roller circle further comprising: a set of at least two cylindrical rollers mounted on each pin of said roller cage structure of said live roller circle.

2. The improved roller circle structure defined in claim 1 wherein the mean diameter of said live roller circle is approximately 200 inches and the contact width of ech of said sets of rollers is approximately 13 inches.

3. The improved roller circle structure defined in claim 1 wherein said cylindrical rollers consist of upset forgings.

* * * * *